United States Patent
Moroney

(10) Patent No.: US 7,289,666 B2
(45) Date of Patent: Oct. 30, 2007

(54) IMAGE PROCESSING UTILIZING LOCAL COLOR CORRECTION AND CUMULATIVE HISTOGRAMS

(75) Inventor: Nathan M. Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 10/658,987

(22) Filed: Sep. 9, 2003

(65) Prior Publication Data
US 2005/0052665 A1    Mar. 10, 2005

(51) Int. Cl.
G06K 9/00    (2006.01)
G03F 3/08    (2006.01)

(52) U.S. Cl. .................. 382/167; 358/518

(58) Field of Classification Search ........ 382/167, 382/162, 168; 358/518, 522, 523, 1.9
See application file for complete search history.

(56) References Cited

U.S. PATENT DOCUMENTS 4,931,864 A    6/1990    Kawamura et al.
6,822,762 B2 *  11/2004   Moroney et al. ............ 358/1.9
2002/0171663 A1 *  11/2002  Kobayashi et al. ......... 345/600

FOREIGN PATENT DOCUMENTS

JP    2002305657    10/2002

OTHER PUBLICATIONS

Gonzalez et al: "Gray-Level Transformations for Interactive Image Enhancement" Merchanism and Machine Theory, Oxford, GB, vol. 12, 1977, pp. 111-122 XP008033667.

Kim et al: "Image Contrast Enhancement Based on the Piecewise-Linear Approximation of CDF" IEEE Transactions on Consumer Electronics, IEEE Inc. NY, US, vol. 45, No. 3, Aug. 1999.

* cited by examiner

Primary Examiner—Yon J. Couso

(57) ABSTRACT

Processing of an image includes estimating a parameter for local color correction. The parameter estimation includes computing a cumulative histogram path length of the image.

34 Claims, 7 Drawing Sheets

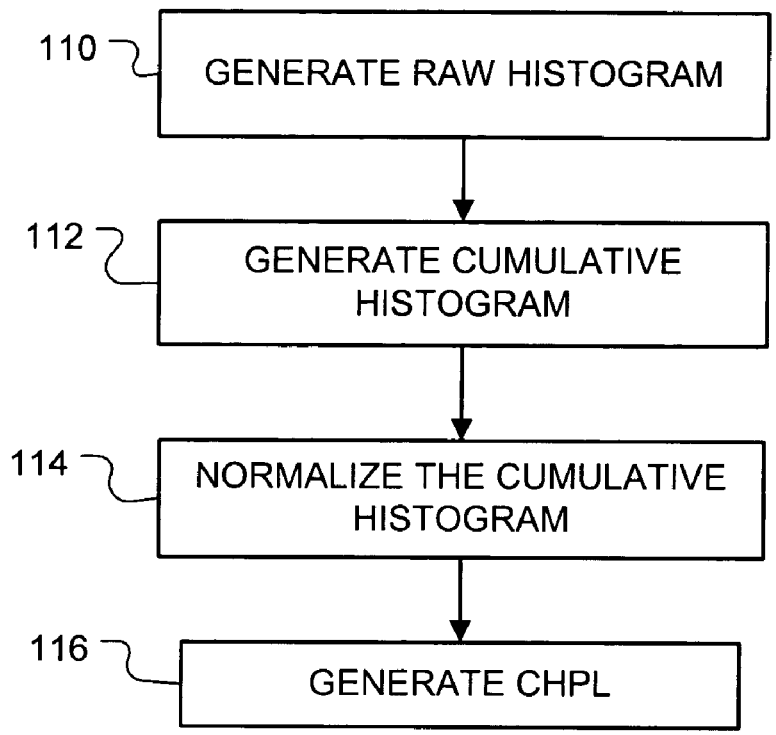

IMAGE PROCESSING UTILIZING LOCAL COLOR CORRECTION AND CUMULATIVE HISTOGRAMS

BACKGROUND

Conventional local color correction algorithms include nonlinear masking, Retinex and its derivatives, and piecewise gamma estimation. These algorithms are useful for improving poorly rendered digital images, images with large dynamic ranges, and images with poor illumination. For example, an image captured by a digital camera is underexposed and dark. The local color correction can be used to correct the image for the underexposure.

These conventional algorithms are not convergent in all cases. That is, these conventional algorithms do not provide a unique solution: they do not indicate the amount of color correction (if any) that provides the best image quality. Instead, they provide multiple possible solutions, all of which depend upon input parameters. Moreover, repeated application of a particular algorithm can degrade the overall image quality.

There is a need for a parameter estimate that can determine whether an image should be color-corrected and, if so, by what amount. Ideally, the parameter estimate should be small or zero if a local color correction algorithm has already been applied. Likewise, the parameter estimate should be small or zero if the image does not require local color correction. The parameter-estimate should also be able to detect corner cases of poorly rendered data and images in obvious need of local color correction, and to avoid correcting those images that would not benefit from local color correction.

SUMMARY

According to one aspect of the present invention, processing of an image includes estimating a parameter for local color correction. The parameter estimation includes computing a cumulative histogram path length of the image. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of a method of performing parameter estimation in accordance with an embodiment of the present invention.

FIGS. 2-6 are illustrations of a simple example of computing a cumulative histogram path length.

DETAILED DESCRIPTION

Figure 3:
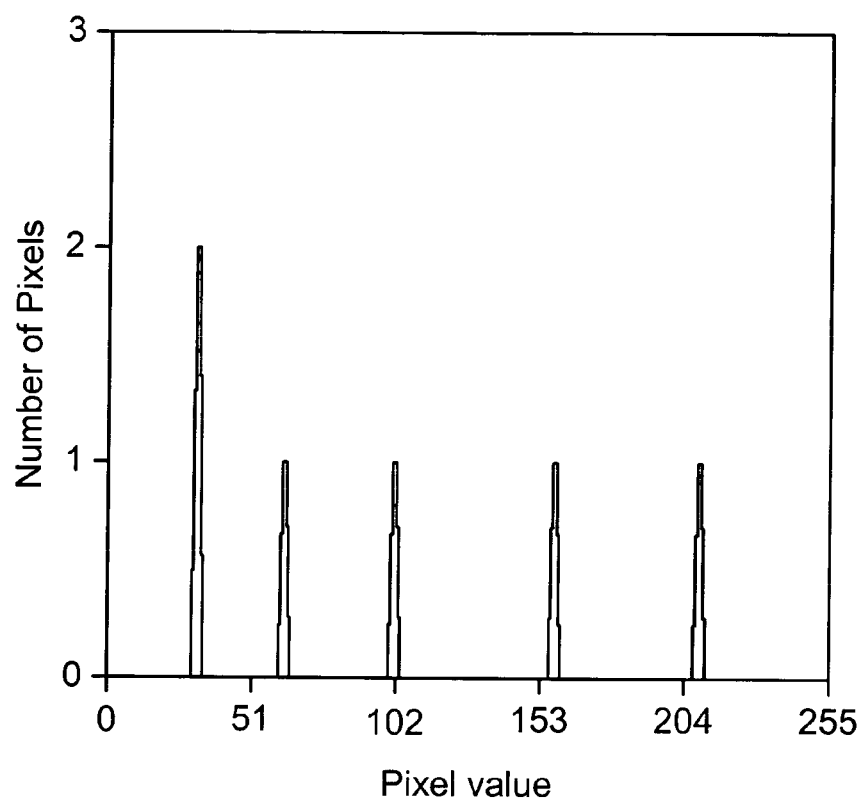

The present invention is embodied in a method for processing a digital image. A parameter estimate is generated using a cumulative histogram path length of an image. The parameter estimate can be used to determine whether the image should be color-corrected and, if so, the amount of color correction. The parameter estimate is small or zero if a local color correction algorithm has already been applied so as to avoid repeated application of the local color correction algorithm.

Reference is made to FIG. 1, which illustrates a method of performing parameter estimation for a digital image. A raw histogram of the image is computed (110). The raw histogram may be computed by splitting the pixel range into equal-sized bins and, counting the number of pixel values that fall into each bin. In general, the raw histogram is shown by color component and the number of bins is a function of the bit depth. For example, the histogram for an 8-bit image has 256 bins, the histogram for a 16 bit image (grayscale, RGB, YUV) has 65535 bins and so on.

A cumulative histogram is generated from the raw histogram (112). The $n^{th}$ bin in the cumulative histogram may be computed by adding the count of the $n^{th}$ bin in the raw histogram to the count of the $n-1^{th}$ bin in the cumulative histogram. Thus a bin in the cumulative histogram represents the number of pixels in the image with a value less than or equal to the bin value.

The cumulative histogram is normalized (114). The normalized cumulative histogram may be computed by dividing cumulative histogram by the number of pixels in the image and digital counts by the maximum pixel value.

A cumulative histogram path length (CHPL) is computed from the normalized cumulative histogram (116). The CHPL is the cumulative sum of the distances between neighboring points in the normalized cumulative histogram.

The CHPL can be used to estimate whether color correction should be performed and, if so, how much local color correction should be applied. The value roughly corresponds to how bi-modal the raw histogram is: the lower the value, the closer to a uniform histogram; and the higher the value, the closer to a bi-modal histogram. For example, for a cumulative histogram normalized to the range 0 to 1, the values of the CHPL range from the square root of two or roughly 1.414, for an image with a flat histogram, to 2.0, for an image consisting of a single digital count. These examples are extremes; in general, natural scenes can have values somewhere between these two extremes.

Figure 4:
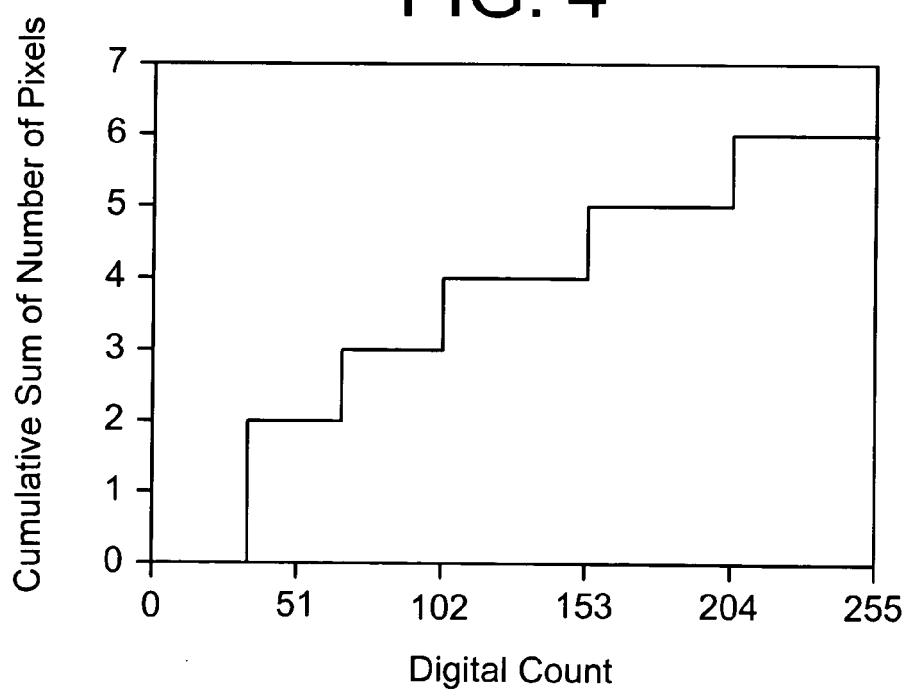
Figure 5:
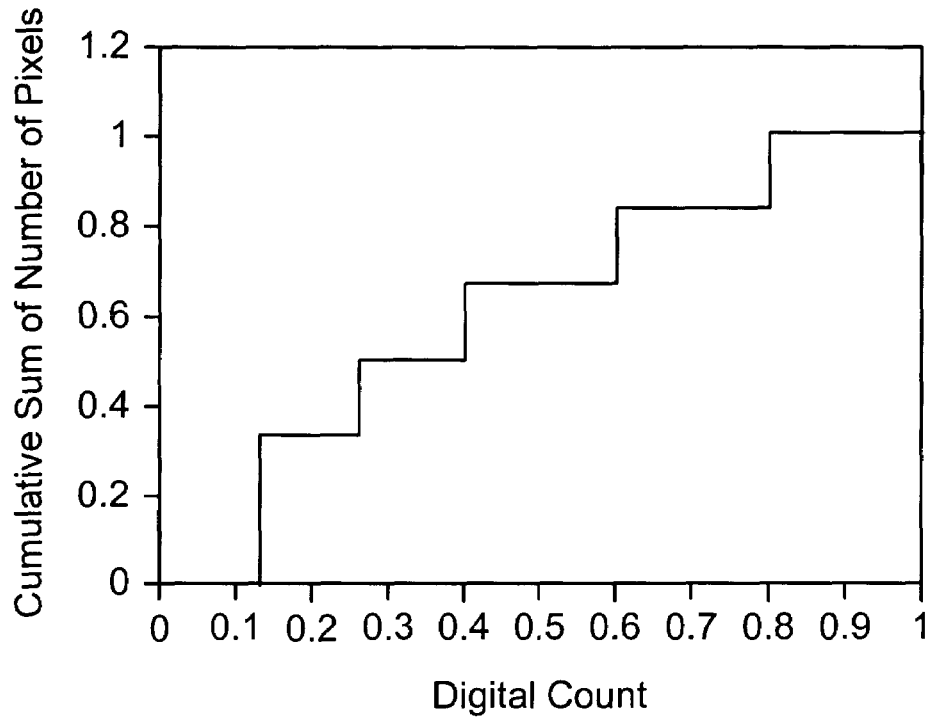

Consider the following example of computing a CHPL for the 3×2 pixel image shown in FIG. 2. The image has 8-bit pixel values. The corresponding raw histogram is shown in FIG. 3. The histogram has five bins, with two pixels falling in the first bin, and one pixel falling in each of the second, third, fourth and fifth bins. The cumulative histogram is illustrated in FIG. 4, and the normalized cumulative histogram is illustrated in FIG. 5. Note that this is an extremely simplified example. In general, images are considerably larger and can have a significant number of different pixel values.

Figure 6:
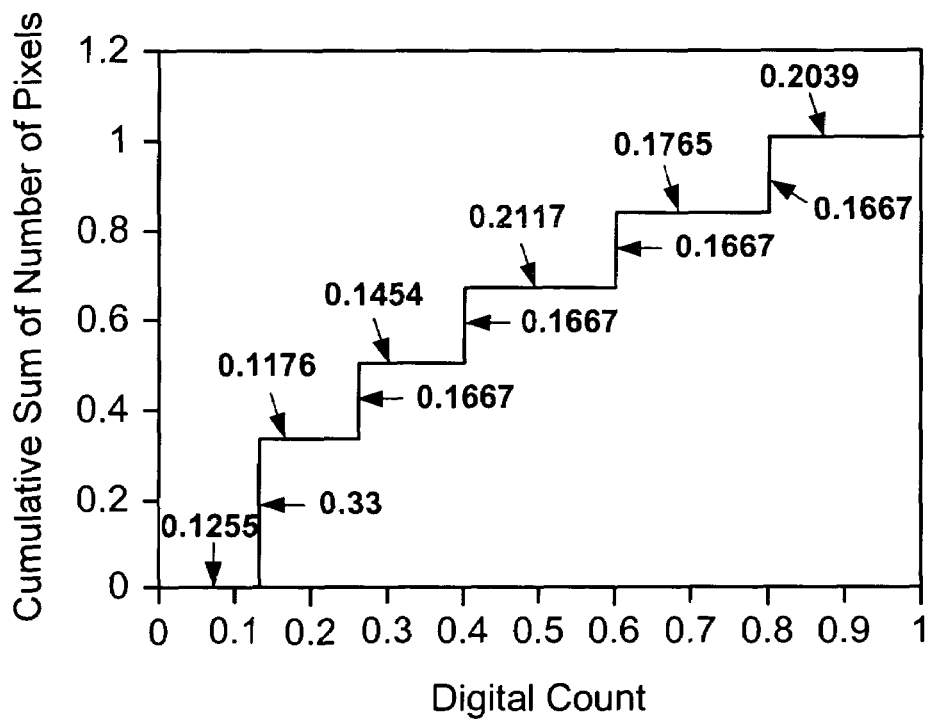

As shown in FIG. 6, the CHPL is computed as a distance between each of the points in the cumulative histogram path length. Specific to FIG. 6, the CHPL is computed as the lengths of the horizontal and vertical line segments. The lengths of the line segments shown in FIG. 6 add up to (0.1255+0.33+0.1176+0.1667+0.1454+0.1667+0.2117+0.1667+0.1765+0.1667+0. 2039)=1.976.

The method is not limited to computing the CHPL as the sum of sides, as shown in FIG. 6. The CHPL could be computed in other ways. For example, the CHPL could be computed as a sum of hypotenuses; or it could be computed by fitting a curve to the cumulative histogram, and determining the curve length.

This method can be applied to a variety of color encodings. It can work with grayscale, RGB, YUV and most commonly used color spaces. If the digital image is represented in YUV space, the cumulative histogram can be computed from the Y color component, and the corresponding strength is used with the local color correction as applied to the Y color component. If the digital image is a grayscale image, the strength of the local color correction applies to the single grayscale component.

If the digital image is represented in a non-perceptual space such as RGB, a cumulative histogram is determined for each color component, and an average cumulative histogram is determined by averaging the cumulative histograms for the three color components. This average cumulative histogram is then used to determine a strength for the local color correction, and local color correction is performed on each of the color components independently.

Figure 7:
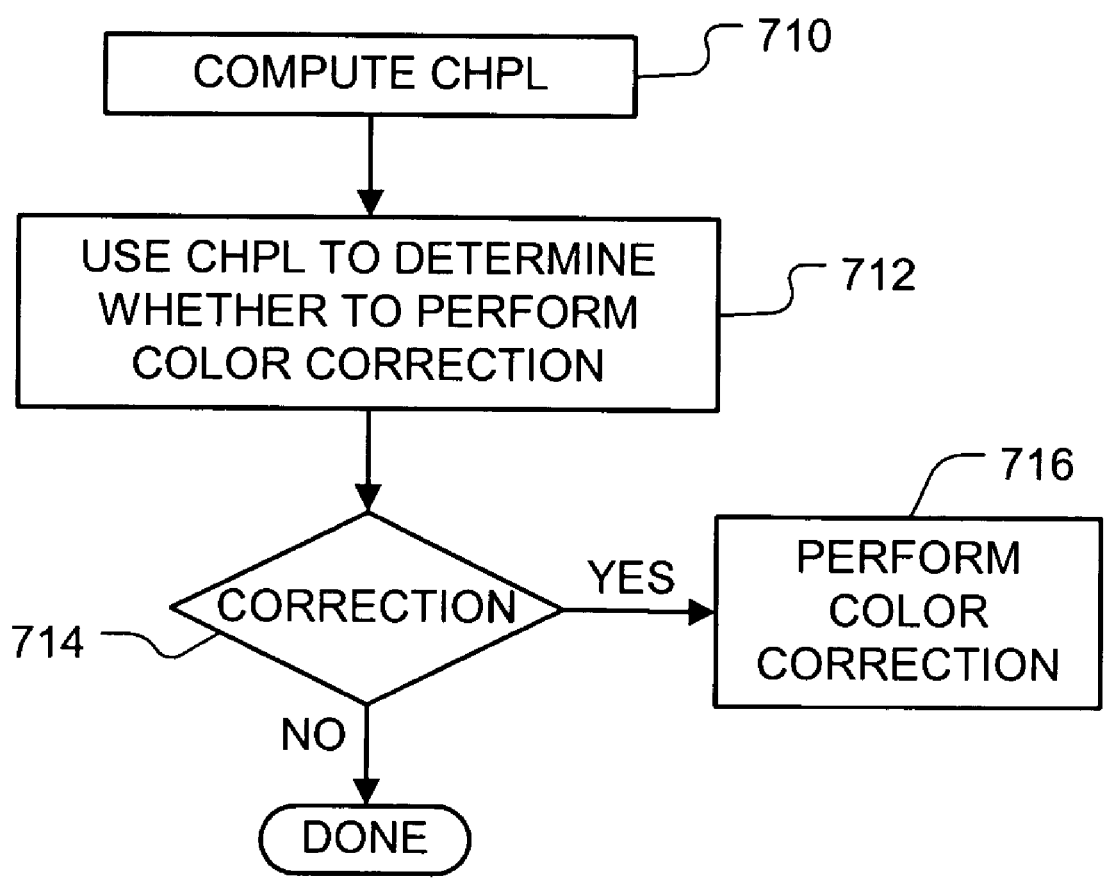
FIG. 7 is an illustration of a method of performing image processing in accordance with a first embodiment of the present invention.

Reference is now made to FIG. 7, which illustrates a first example of using the CHPL. The CHPL is computed for a digital image (710), and used to determine whether color correction should be performed (712). The decision to perform color correction can be based on assumptions about the value of the CHPL. For example, an assumption may be made that if the value of a CHPL is greater than an upper threshold (e.g., 1.65), then that CHPL is not a natural scene (e.g., it is computer generated) and does not require correction. Similarly, another assumption may be made that if the value of a CHPL is below a lower threshold (e.g., 1.5), then that CHPL is well rendered and does not require correction. Thus, the color correction would be performed if the CHPL is within a range defined by upper and lower thresholds.

If the cumulative histogram path length indicates that the image should be color corrected (714), the color correction is performed (716). The color correction may be performed by using a conventional local color correction algorithm such as nonlinear masking, Retinex, or piecewise gamma estimation may be used. Other algorithms that may be used are disclosed in U.S. Ser. No. 10/136,966 filed May 2, 2003 entitled "Local Color Correction" and incorporated herein by reference.

Figure 8:
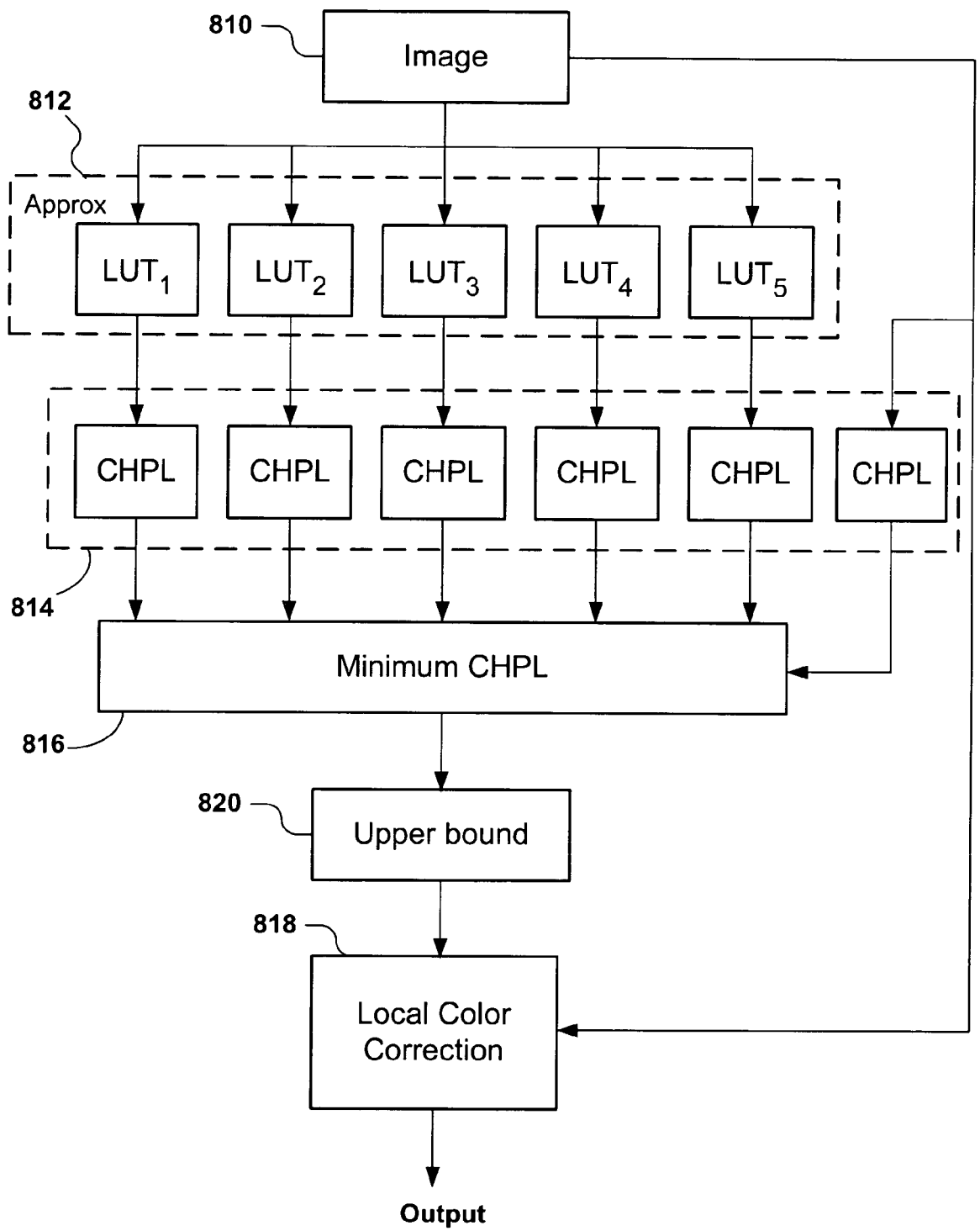
FIG. 8 is an illustration of a method of performing image processing in accordance with a second embodiment of the present invention.

Reference is now made to FIG. 8, which illustrates a second example of using the CHPL. An image 810 is color corrected at different "strengths" (812). The strength is the amount or aggressiveness of the local color correction. The color correction at this stage can be an approximation of the local color correction that will be performed later. This approximation can be performed by applying the local color correction algorithm to the image at different strengths.

The approximation is not limited to any particular local color correction algorithm. However, the sigmoidal-exponential tone reproduction disclosed in U.S. Ser. No. U.S. Ser. No. 10/136,966 can be implemented efficiently as a series of different lookup tables ($LUT_1$, $LUT_2$, . . . ) for different strengths (e.g., 0, 64, 128, 192, and 255).

A plurality of CHPLs are computed, one for each color-corrected image (block 814). A CHPL is also computed for an image that is not color corrected. The CHPL having the lowest value (that is, the minimum histogram path length) is selected (block 816). Many images will have the same cumulative histogram path length, but not all images with that cumulative histogram path length will need local color correction. For an image not needing color correction, the LUTs will produce a set of cumulative histogram path lengths that are longer than the CHPL for the uncorrected image. Since the CHPL corresponding to no color correction will be shortest, these image will not be color corrected. However for an image needing color correction, one of the outputs from the LUTs will have the shortest cumulative histogram path length. The correction strength corresponding to this minimum is used to perform local color correction of the image, if any (818). The local color correction at block 818 is not an approximation.

An upper bound on the minimum CHPL can be determined (820). It is possible in some cases, such as driver processing, that a highly bimodal image (e.g., a bar chart) would have a very high cumulative histogram path length, but would not likely benefit from local color correction. The upper bound can minimize the chance of processing graphics or images that are highly bi-modal by nature, such as astronomical images with a majority of black or low pixel values.

Figure 9:
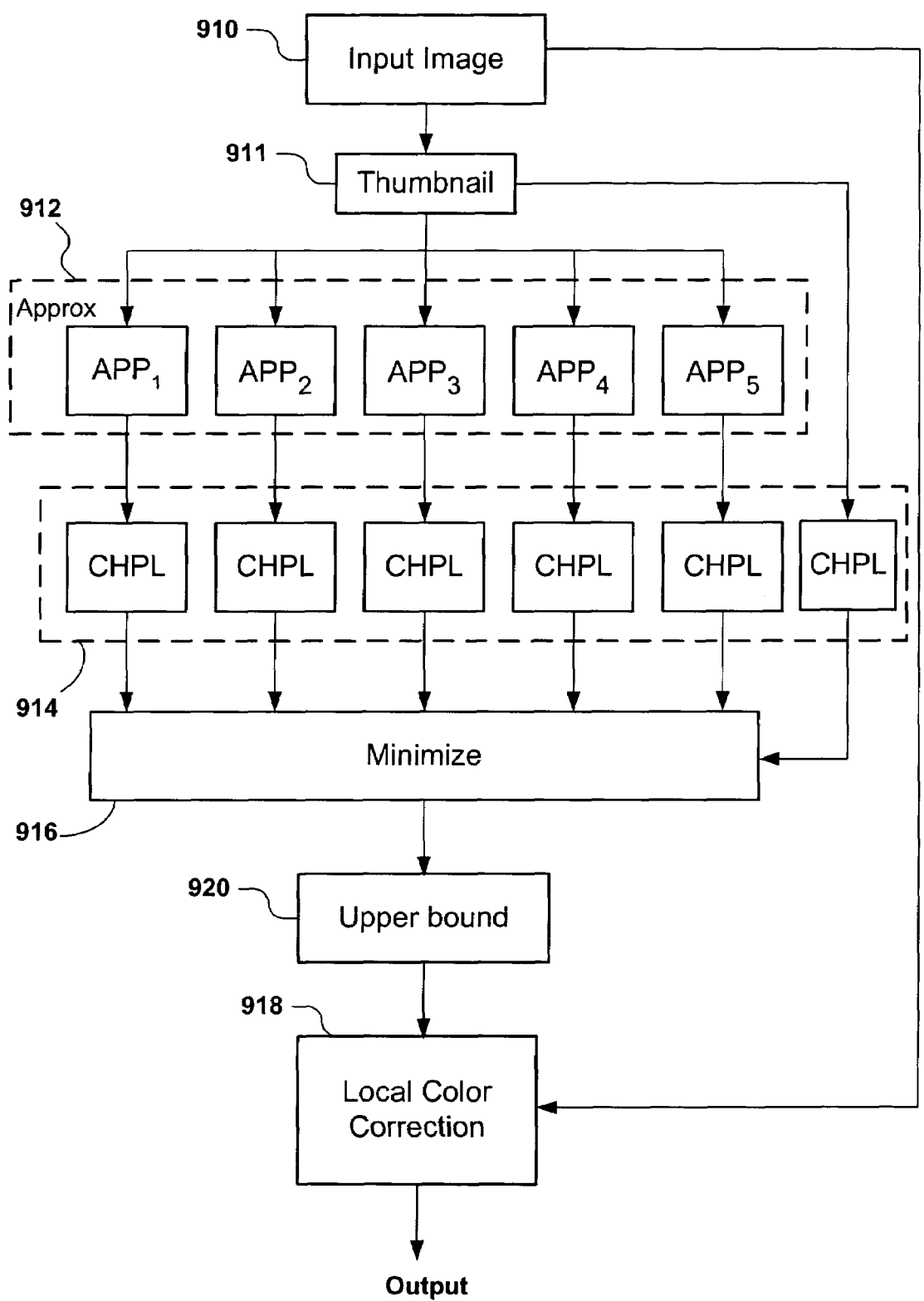
FIG. 9 is an illustration of a method of performing image processing in accordance with a third embodiment of the present invention.

FIG. 9 illustrates a third example of using the CHPL. The third example is essentially the same as the second example, except as follows. First, the approximation is inferred from a thumbnail 911 of the original image 910. The use of the thumbnail 911 allows an even faster estimation of the cumulative histogram path length. For processing pipelines that include thumbnails, such as digital cameras, the use of thumbnails instead of full sized images can be considerably faster.

Second, the approximation is performed by using multiple settings of different local color correction algorithms 912. For example, the approximation may be performed by piece-wise gamma at different strengths, Retinex at different strengths, and different strengths of the local color correction algorithm disclosed U.S. Ser. No. 10/136,966. In the alternative, the approximation may be performed by applying the same algorithm at different strengths.

Afterward a minimum CHPL is computed for the thumbnail (914-916), an upper bound is placed on the minimum CHPL (920), and local color correction, if any, is performed on the original image (918).

The method according to the present invention can be useful for enhancing or improving several types of images. For example, conventional photography may yield an image in which one region of the image is underexposed while another region is correctly exposed. Flash photography is another instance in which one region in the image may be over exposed while another is under exposed. For these situations, a complex local correction technique based on the human visual system may be inappropriate. In addition, some image scenes have a wide dynamic range. The method provides a solution to improve the image quality in these situations.

Figure 10:
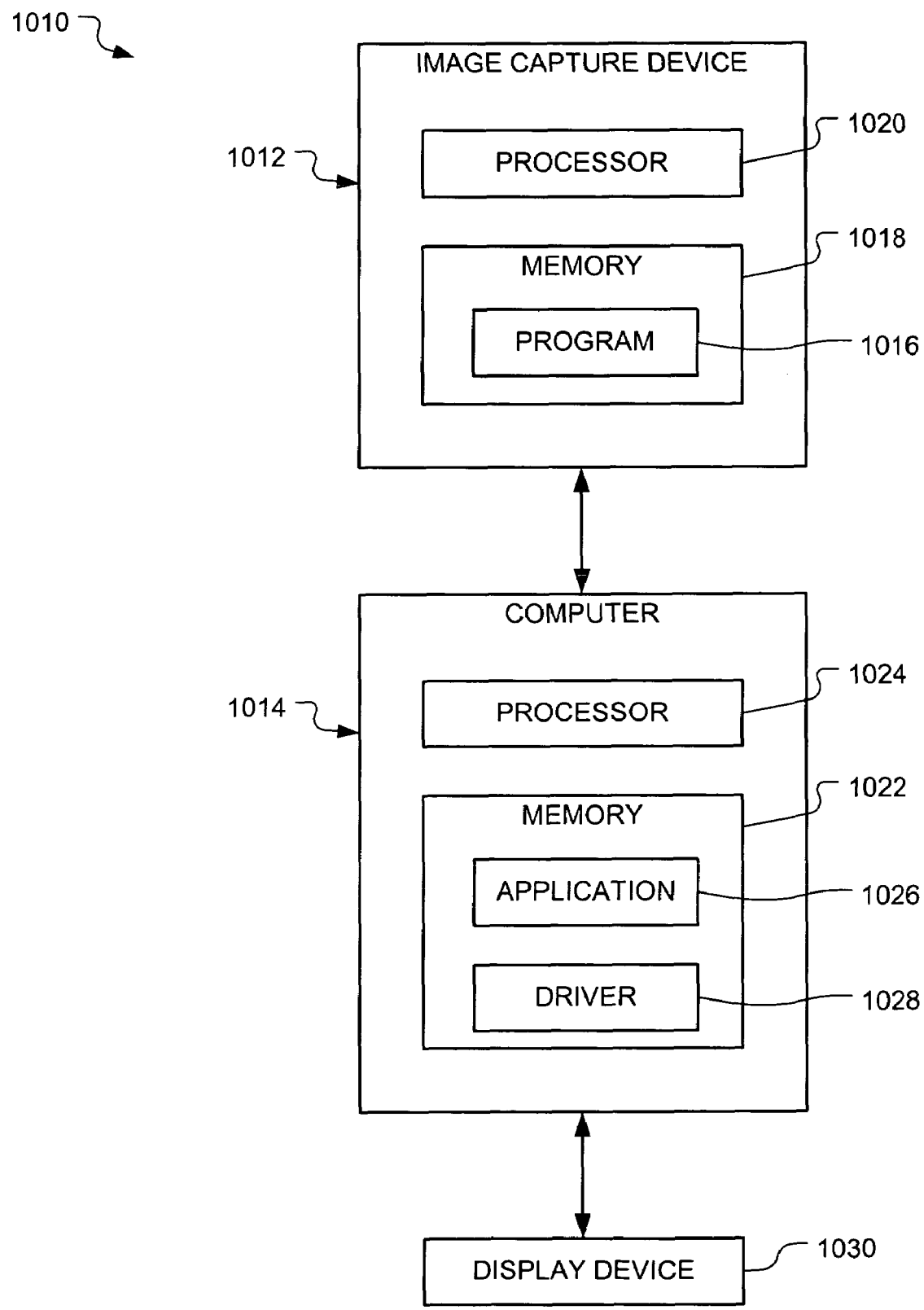
FIG. 10 is an illustration of a system in accordance with an embodiment of the present invention.

The method according to the present invention can be implemented at several stages of an image-processing pipeline. Consider the system 1010 shown in FIG. 10, which includes an imaging device 1012 (e.g., a digital camera, a scanner) and a computer 1014. The method according to the present invention may be performed in the imaging device 1012 or the computer 1014. The imaging device 1012 or the computer 1014 can correct the color tone of images that were captured with uneven exposure or flash illumination, post-process images with a high dynamic range, etc.

A program 1016 can be stored in memory 1018 of the imaging device 1012. When executed, the program 1016 can instruct a processor 1020 of the imaging device 1012 to perform the method according to the present invention.

A set of instructions can be stored in memory 1022 of the computer 1014. When executed, the instructions can instruct a processor 1024 of the computer 1014 to perform the method according to the present invention. The instructions can be part of an image processing application 1026 or it could be part of another application (such as a web browser application). The instructions could even be implemented as part of a device driver 1028 such as a printer driver, so that the driver performs correction on an image before a display device 1030 displays the color-corrected image.

The method according to the present invention can be used to complement traditional pixel-based processing. For example, once the image is color corrected, the color-corrected image can be reproduced on a printer using a traditional pixel-based pipeline.

Although several specific embodiments of the present invention have been described and illustrated, the present invention is not limited to the specific forms or arrangements of parts so described and illustrated. Instead, the present invention is construed according to the claims the follow.

The invention claimed is:

1. A method of processing an image, the method comprising estimating a parameter for local color correction, the parameter estimation including computing a cumulative histogram path length of the image.

2. The method of claim 1, wherein computing the cumulative histogram path length includes:
   generating a raw histogram of the image;
   generating a cumulative histogram of the image from the raw histogram; and
   determining the cumulative histogram path length of the image from the cumulative histogram.

3. The method of claim 2, further comprising normalizing the cumulative histogram, wherein the cumulative histogram path length is computed from the normalized cumulative histogram.

4. A method for processing an image, the method comprising:
   performing different local color corrections for the image; and
   computing cumulative histogram path lengths for the different color corrections.

5. The method of claim 4, further comprising selecting the cumulative histogram path length having the shortest length.

6. The method of claim 5, further comprising computing the cumulative histogram path length for the image uncorrected; wherein the selection is also based on the cumulative histogram path length for the uncorrected image.

7. The method of claim 5, further comprising performing full local color correction on the image, the full correction corresponding to the minimum cumulative histogram path length.

8. The method of claim 4, wherein different local color correction algorithms are used to perform the different local color corrections.

9. The method of claim 4, wherein different correction strengths are used to perform the different local color corrections.

10. The method of claim 4, wherein the different local color corrections are approximations.

11. The method of claim 4, wherein the different local color corrections are performed using a sigmoidal-exponential tone reproduction algorithm at different strengths.

12. The method of claim 11, wherein the different local color corrections and implemented in lookup tables.

13. The method of claim 4, further comprising computing an upper bound for the minimum cumulative histogram path length.

14. The method of claim 4, wherein the image is a thumbnail image.

15. Apparatus for processing an image, the apparatus comprising:
   means for generating a cumulative histogram path length of the image; and
   means for using the cumulative histogram path length to determine whether the image should be color-corrected.

16. The apparatus of claim 15, further comprising means for determining a strength of local color correction.

17. The apparatus of claim 15, further comprising means for performing local color correction according to a minimum cumulative histogram path length.

18. Apparatus for processing an image, the apparatus comprising a processor for determining a cumulative histogram path length of the image, and using the cumulative histogram path length to determine whether the image should be color-corrected.

19. The apparatus of claim 18, wherein determining the cumulative histogram path length includes generating a raw histogram of the image; generating a cumulative histogram of the image from the raw histogram; and determining the cumulative histogram path length of the image from the cumulative histogram.

20. The apparatus of claim 18, wherein the processor performs a plurality of different local color corrections for the image, determines an initial cumulative histogram path length for each local color correction, determines an initial cumulative histogram path length for the image uncorrected, and determines the cumulative histogram path length of the image as the minimum of the initial cumulative histogram path lengths.

21. The apparatus of claim 20, wherein the processor further performs full local color correction on the image, the full correction corresponding to the minimum cumulative histogram path length.

22. The apparatus of claim 20, wherein the processor also computes an upper bound for the minimum cumulative histogram path length.

23. The apparatus of claim 20, wherein the different local color corrections are performed using a sigmoidal-exponential tone reproduction algorithm at different strengths.

24. The apparatus of claim 23, wherein the different local color corrections are implemented in lookup tables.

25. The apparatus of claim 23, wherein the different local color corrections are approximations.

26. The apparatus of claim 18, wherein the apparatus is an imaging device.

27. An article for a processor for processing an image, the article comprising computer memory encoded with instructions for instructing the processor to generate a cumulative histogram path length of the image; and use the cumulative histogram path length to determine whether the image should be color-corrected.

28. The article of claim 27, wherein determining the cumulative histogram path length includes generating a raw histogram of the image, generating a cumulative histogram of the image from the raw histogram, and determining the cumulative histogram path length of the image from the cumulative histogram.

29. The article of claim 27, wherein the instructions instruct the processor to perform a plurality of different local color corrections for the image, determine an initial cumulative histogram path length for each local color correction, determine an initial cumulative histogram path length for the image uncorrected, and determine the cumulative histogram path length of the image as the minimum of the initial cumulative histogram path lengths.

30. The article of claim 29, wherein the instructions also instruct the processor to perform full local color correction on the image, the full correction corresponding to the minimum cumulative histogram path length.

31. The article of claim 29, wherein the instructions also instruct the processor to compute an upper bound for the minimum cumulative histogram path length.

32. The article of claim 29, wherein the different local color corrections are performed using a sigmoidal-exponential tone reproduction algorithm at different strengths.

33. The article of claim 29, wherein computer memory is further encoded with lookup tables for implementing the different local color corrections.

34. The article of claim 29, wherein the different local color corrections are approximations.

* * * * *